United States Patent [19]
Ueda et al.

[11] Patent Number: 5,328,875
[45] Date of Patent: Jul. 12, 1994

[54] CUBIC BORON NITRIDE-BASE SINTERED CERAMICS FOR CUTTING TOOL

[75] Inventors: Fumihiro Ueda; Itsurou Tazima; Masayuki Yageta, all of Omiya, Japan

[73] Assignee: Mitsubishi Materials Corporation, Tokyo, Japan

[21] Appl. No.: 974,505

[22] Filed: Nov. 12, 1992

[51] Int. Cl.$^5$ .................. C04B 35/52; C04B 35/56
[52] U.S. Cl. ................................. 501/87; 501/93; 501/98; 51/307
[58] Field of Search ............... 501/87, 93, 98; 51/307

[56] References Cited

U.S. PATENT DOCUMENTS

| | | | |
|---|---|---|---|
| 2,888,355 | 5/1959 | Taylor | 501/87 |
| 4,029,000 | 6/1977 | Nakamura et al. | 501/87 |
| 4,379,852 | 4/1983 | Watanabe et al. | 501/93 |
| 5,200,372 | 4/1993 | Kuroyama et al. | 501/98 |

FOREIGN PATENT DOCUMENTS 2048956 12/1980 United Kingdom .
2049654 12/1980 United Kingdom .

OTHER PUBLICATIONS

Journal of Hard Materials, vol. 2, No. 3-4, pp. 233-243, F. Ueda, et al., "Microstructure and Mechanical Properties of cBN-TiN Composites".

Primary Examiner—Mark L. Bell
Assistant Examiner—Deborah Jones
Attorney, Agent, or Firm—Oblon, Spivak, McClelland, Maier & Neustadt

[57] ABSTRACT

The ceramics of the present invention comprises a composition having a bonding phase constituent component, a dispersed phase constituent component, and unavoidable impurities. The bonding phase constituent component has one or more of titanium and aluminum carbide, nitride and carbonitride compounds including oxygen, and 20% to 48% by volume of decomposed reaction phase cubic crystal boron nitride. The dispersed phase constituent component comprises cubic crystal boron nitride, and the decomposed reaction phase comprises one or more of titanium carbide, titanium nitride and titanium carbonitride, and one or more of aluminum oxide and aluminum nitride, as well as titanium boride. The crystal grain sizes in the bonding phase comprising the decomposed reaction phase, and the crystal grain sizes in the dispersed phase comprising the cubic boron nitride are all substantially less than 1 micron. The titanium and aluminum carbide compound is preferably $Ti_{2-3}AlC$, the titanium and aluminum nitride compound is substantially $Ti_{2-3}AlN$, and the titanium and aluminum carbonitride compound is substantially $Ti_{2-3}AlCN$. The decomposed reaction phase substantially comprises one or more of TiC, TiN, TiCN, $Al_2O_3$, AlN and $TiB_2$.

1 Claim, 1 Drawing Sheet

CUBIC BORON NITRIDE-BASE SINTERED CERAMICS FOR CUTTING TOOL

BACKGROUND OF THE INVENTION

1. Technical Field

The present invention relates to cubic boron nitride-base sintered ceramics for cutting tool. The sintered ceramics is such that the ceramics do not suffer cutting edge damage and chipping even when used under severe conditions such as high speed or high feed rate interrupted cutting of hardened steels, and their cutting edge exhibits an excellent resistance to wear.

2. Background Art

Cubic boron nitride (denoted as c-BN below)-based ceramics sintered under high pressure and high temperature are known. For example publication of unexamined J.P. Patent Application Laid Open No. 55-62862 discloses a c-BN ceramics sintered under high pressure and having 10% to 60% by volume of one or more of titanium carbide, titanium nitride, and titanium carbonitride (denoted hereunder as TiC, TiN and TiCN) as a bonding phase, 0.1% to 18% by volume of aluminum oxide (denoted hereunder as $Al_2O_3$) as a bonding phase, and the remainder of c-BN as a dispersed phase, and unavoidable impurities (note: in the above and the following, percentage refers to percentage by volume).

Furthermore, the use of cutting tips formed from this high pressure sintered ceramics for finishing cutting of ceramics such as hardened steels having a Rockwell hardness (C scale) of 55-62, and for finish cutting of materials such as nickel or cobalt based super alloys is well known.

On the other hand, in recent years the increase in the performance of cutting machines has resulted in remarkable labor savings together with a trend toward higher cutting speeds and heavier cutting. With the beforementioned cutting tips however made from c-BN high pressure sintered ceramics, the strength of these tips is inadequate. Especially for high speed interrupted cutting of high strength steels such as case carborized hardened steels and high frequency hardened steels, or for cutting under severe conditions such as high feed interrupted cutting. Moreover, due to this lack of strength, the cutting edge of the cutting tip is susceptible to cracking and chipping resulting in unsatisfactory cutting performance.

The present inventors have studied the beforementioned conventional cutting tips manufactured from c-BN ceramics sintered under high pressure, from the view point of the above situation and has conducted experiments aimed at improving the strength. Results (1), (2) and (3) of these experiments are given below.

(1) With the conventional cutting tip manufactured from c-BN high pressure sintered ceramics, it was found that the crystal grain sizes of one or more of the TiC, TiN, TiCN and $Al_2O_3$ forming the bonding phase exceeded a maximum grain size of 3 microns. The reason for the large crystal grain size was considered due to the fact that even when manufacturing the cutting tip using minute grain sizes of less than 1 micron for the raw material powder, grain growth occurred during the high pressure sintering. Consequently, with the existence of crystal grain sizes in the bonding phase exceeding a maximum grain size of 3 microns, sufficient strength could not be maintained.

(2) In the above case, it was ascertained that even though grain growth occurred in the bonding phase, the high pressure sintering process had practically no influence on the crystal grain size of c-BN. Accordingly, if a c-BN powder having a crystal grain size of not more than 1 micron was used for the raw material powder, the c-BN crystal grain size remained below 1 micron even after the high pressure sintering process.

(3) On the other hand, when using one or more of titanium and aluminum nitride, carbide or carbonitride compounds (denoted hereunder as $Ti_{2-3}AlN$, $Ti_{2-3}AlC$, and $Ti_{2-3}AlCN$ respectively) with an oxygen content preferably in the range from 8% to 20% by weight as a raw material powder for the bonding phase, these compounds appear to decompose during the high pressure sintering process and react with the c-BN.

In this reaction one or more of TiC, TiN and TiCN, one or more of $Al_2O_3$ and aluminum nitride (denoted hereunder as AlN), and titanium boride (denoted hereunder as $TiB_2$) is formed, these compounds making up the bonding phase, and having extremely fine crystal grain sizes of not more than 1 micron. At the same time, the c-BN high pressure sintered ceramics is formed with the c-BN dispersed phase having a crystal grain size of less than 1 micron. The above noted results (1), (2) and (3) of these experiments were known by the inventors but not to the public.

By making the cutting tips from the above mentioned ceramics, the cutting tip is attributed with an extremely high strength, so that even when cutting under severe conditions, damage and chipping (micro crack) of the cutting edge of the cutting tip does not occur. Furthermore, the cutting tip is found to exhibit excellent wear resistance.

SUMMARY OF THE INVENTION

The objective of the present invention is to present a high strength ceramics for cutting tools of high toughness and high resistance to wear and chipping.

The ceramics of the present invention is based on the above experimental results, and is composed of 20% to 48% by volume of decomposed reaction phase derived from the reaction of one or more of $Ti_2AlN$, $Ti_2AlC$, and $Ti_2AlCN$ (having oxygen) and c-BN as a bonding phase and c-BN as a dispersed phase derived from the reaction of one or more of $Ti_2AlN$, $Ti_2AlC$, and $Ti_2AlCN$ (having oxygen) and c-BN as a bonding phase and, and unavoidable impurities.

In this ceramics, the decomposed reaction phase comprises one or more of TiC, TiN, TiCN, and one or more of $Al_2O_3$ and AlN, as well as $TiB_2$. Furthermore, the resultant high strength c-BN high pressure sintered ceramics is such that the crystal grain sizes in the bonding phase made up of the decomposed reaction phase, and the dispersed phase made up of c-BN are substantially not greater than 1 micron.

The range limits of 20–48% by volume for the bonding phase in the c-BN high pressure sintered ceramics of the present invention for the manufacture of cutting tips are set for the following reasons. The lower limit of 20% is set because if the percentage by volume is less than 20%, the proportion of c-BN becomes large exceeding 80% and resulting in a pronounced drop in the toughness. On the other hand, if the percentage by volume exceeds 48%, the proportion of c-BN in effect becomes less than 52% so that the desirable excellent wear resistant properties cannot be maintained.

With the ceramics tip of the present invention, the crystal grain size in the bonding phase and dispersed phase of the c-BN high pressure sintered ceramics should be not greater than 1 micron. The reason for this is that, as mentioned before, if either of the bonding phase or dispersed phase have course grains with grain sizes over 1 micron, then, in particular when cutting under extremely severe conditions, the course grains act as a starting point for the occurrence of damage and chipping of the cutting edge.

In the sintering process for the ceramics of the present invention, when using one or more of titanium and aluminum nitride, carbide, or carbonitride compounds (denoted hereunder as $Ti_{2-3}AlN$, $Ti_{2-3}AlC$, and $Ti_{2-3}AlCN$ respectively) with an oxygen content preferably in the range from 5% to 15% by volume, as a raw material powder for the bonding phase component, these compounds are decomposed during the high pressure sintering process and react with the c-BN.

In this reaction, one or more of TiC, TiN or TiCN, and one or more of $Al_2O_3$ and aluminum nitride (denoted hereunder as AlN), and titanium boride (denoted hereunder as $TiB_2$) is formed, these compounds making up the bonding phase, and having an extremely fine crystal grain size of not more than 1 micron. At the same time, the c-BN high pressure sintered material is formed with the c-BN dispersed phase having a crystal grain size of less than 1 micron.

By making the cutting tips from the above mentioned material, the cutting tip is attributed with an extremely high strength, so that even when cutting under severe conditions, damage and chipping (minute fractures) of the cutting edge of the cutting tip does not occur. Furthermore, the cutting tip is found to exhibit excellent wear resistance.

EXAMPLES

Figure 1:
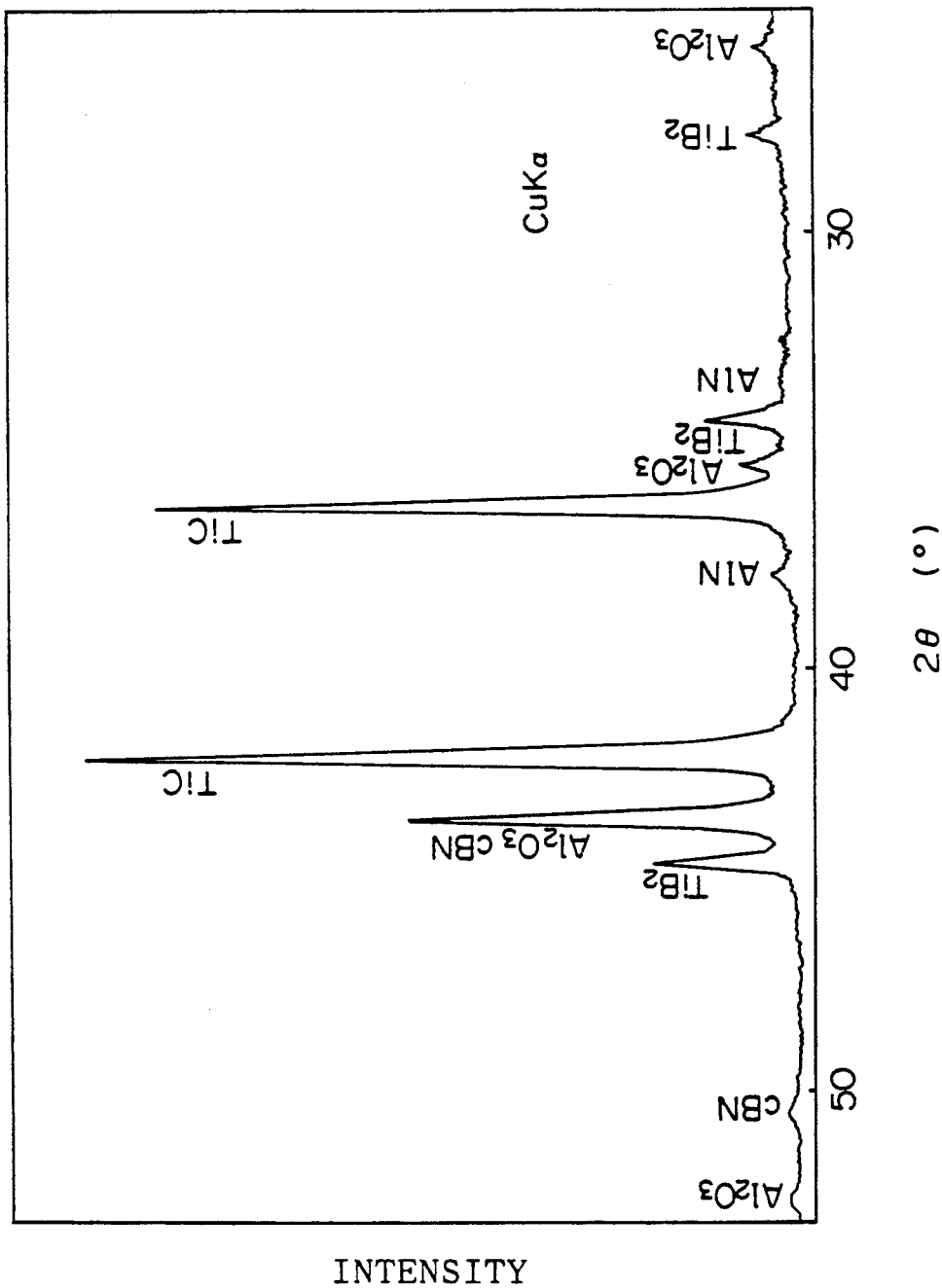
FIG. 1 is an X ray diffraction diagram of a sample of tool ceramics according to the present invention after sintering.

Then, an oxidation process is carried out on the mixture by holding the mixture for one hour at a predetermined temperature within the range from 200° C. to 400° C. in an atmosphere of oxygen and argon gas, the oxygen having a partial pressure within the range of 0.005% to 1%, to prepare the respective $Ti_2AlN$, $Ti_2AlC$ and $Ti_2AlCN$ raw material powders for the bonding phase, with oxygen contents as shown in the Table 1.

The respective powders are then combined with the c-BN powder as the raw material powder for forming the dispersed phase, in the proportions shown in Table 1, using a centrifuge to classify the powders so that none of the grain sizes exceeds 1 micron. The powders are then wet mixed in a ball mill under the same conditions as beforementioned, and dried.

After this, the respective powders are press molded on support tips at 2 ton/cm$^2$ to form pressed powder bodies, the support tips being made of tungsten carbide with 10% by weight of cobalt, and having dimensions of 10 mm diameter and 2 mm thickness. The pressed powder bodies and support tips are then placed together in an high pressure sintering apparatus and sintered at a pressure of 6.2 GPa and a temperature of 1500° C.

In this way the ceramics of the present invention were obtained having the dispersed phase and bonding phase proportions substantially the same as the compound proportions. Specimens of these ceramics were manufactured into cutting tips 1 to 13 with thicknesses as shown in Table 1.

In addition, sintered bodies having compositions similar to the respective cutting tips 2, 4, 5 and 6, were cut up with a wire electric discharge process and then polished with a diamond grindstone (finished with #1200 diamond grindstone) to obtain 12 mm long test pieces 1 mm in depth and 2 mm wide. The bending strength of these test pieces was then determined by carrying out a three point bend test over a 10 mm span. These results are also shown in Table 1.

TABLE 1

| Cutting tips of present invention | Compound Composition (vol %) | | | | Thickness (mm) | Bending strength (MPa) |
| --- | --- | --- | --- | --- | --- | --- |
| | Composition | Oxygen content (weight %) | Bonding phase component powder | c-BN powder | | |
| 1 | $Ti_2AlN$ | 12 | 30 | 70 | 1.5 | — |
| 2 | $Ti_2AlC$ | 12 | 45 | 55 | 1.5 | 1190 |
| 3 | $Ti_2AlN$ | 12 | 40 | 60 | 1.0 | — |
| 4 | $Ti_2AlC$ | 12 | 35 | 65 | 1.5 | 1240 |
| 5 | $Ti_3AlN$ | 12 | 40 | 60 | 1.5 | 1020 |
| 6 | $Ti_2AlCN$ | 12 | 40 | 60 | 1.5 | 1050 |
| 7 | $Ti_2AlCN$ | 12 | 48 | 52 | 2.5 | — |
| 8 | $Ti_3AlN$ | 18 | 10 | 80 | 1.5 | — |
| | $Ti_2AlC$ | 8 | 10 (20) | | | — |
| 9 | $Ti_2AlC$ | 14 | 15 | 70 | 1.5 | — |
| | $Ti_2AlCN$ | 10 | 15 (30) | | | — |
| 10 | $Ti_2AlN$ | 8 | 10 | | | — |
| | $Ti_2AlC$ | 10 | 10 | 65 | 1.5 | — |
| | $Ti_2AlCN$ | 12 | 15 (35) | | 1.5 | — |
| 11 | $Ti_2AlN$ | 5 | 40 | 60 | 1.5 | — |
| 12 | $Ti_2AlC$ | 3 | 45 | 55 | 1.5 | — |
| 13 | $Ti_2AlN$ | 2 | 30 | 70 | 1.5 | — |

As follows is a description of actual examples of ceramics for cutting tip manufactured according to the present invention.

In the manufacturing process, at first wet type pulverized mixing of respective $Ti_2AlN$, $Ti_2AlC$ and $Ti_2AlCN$ powders is carried out in a ball mill with 0.2 mm to 1.5 mm diameter balls made of tungsten carbide.

In order to compare the results for the cutting tips of the present invention with those made from the conventional materials, powdered TiC, TiN, TiCN, $Al_2O_3$, AlN, $TiB_2$ and c-BN with the grain sizes controlled so as not exceed 1 micron were prepared as raw material powders. These were mixed according to the mixture compositions shown in Table 2 with other conditions the same as for the previous preparations. Conventional cutting tips 1 to 10 as shown in Table 2 having compositions substantially the same as the previous mixture compositions were then manufactured.

In addition, sintered bodies having the same composition as the conventional cutting tips 2 and 5 were subjected to the bending test in a similar manner to that beforementioned, and the bending strength obtained. The results are shown in Table 2.

TABLE 2

| Conventional cutting tips | Mixture composition (vol %) | | | | | | thickness (mm) | bending strength (MPa) |
|---|---|---|---|---|---|---|---|---|
| | TiC | TiN | TiCN | Al$_2$O$_3$ | AlN | TiB$_2$ | c-BN | | |
| 1 | — | 20 | — | 5 | — | 5 | remainder | 1.5 | — |
| 2 | 30 | — | — | 5 | — | 2 | " | 2.0 | 800 |
| 3 | — | 20 | — | 10 | — | 10 | " | 1.0 | — |
| 4 | 20 | — | — | 10 | — | 5 | " | 1.5 | — |
| 5 | — | 10 | — | 15 | — | 10 | " | 0.5 | 750 |
| 6 | — | — | 30 | 5 | — | 5 | " | 1.5 | — |
| 7 | — | — | 23 | 15 | 5 | 5 | " | 2.2 | — |
| 8 | 5 | 5 | — | — | 5 | 5 | " | 2.5 | — |
| 9 | 5 | — | 5 | 5 | — | 15 | " | 1.5 | — |
| 10 | 5 | 5 | 10 | 5 | — | 5 | " | 1.5 | — |

With regards to the results obtained for the various cutting tips, the bonding phases were measured by X-ray diffraction, and the c-BN and bonding phase maximum crystal grain sizes were measured.

In manufacturing the various cutting tips, the c-BN sintered ceramics was cut up into six segment pieces by the electric discharge machine, and these were soldered to a tungsten carbide base, and ground to form throw away tips having a TPGA322 profile.

Cutting tests were carried out under the following conditions (referred to as "A" cutting conditions below) involving high speed interrupted finishing cutting of carburized hardened steel.

Work piece: SCr415 (surface hardness: HR C 62) cylindrical bar having 8 evenly spaced longitudinal grooves formed around the periphery thereof.
Cutting speed: 250 m/min
Feed rate: 0.1 mm/rev
Cut depth: 0.1 mm
Cutting time: 10 mins.

Subsequently, cutting tests were carried out under the following conditions (referred to as "B" cutting conditions below) involving high speed interrupted finishing cutting of carburized hardened steel.

Work piece: SCM418 (surface hardness: HR C 55) cylindrical bar having 8 evenly spaced longitudinal grooves formed around the periphery thereof.
Cutting speed: 150 m/min
Feed rate: 0.4 mm/rev
Cut depth: 0.1 mm
Cutting time: 10 mins The wear widths of the respective cutting edge relief surfaces were measured for each of the tests. The results of these measurements are shown in Tables 3 and 4.

As shown in Tables 1 to 4, the cutting tips 1 to 13 of the present invention both have crystal grain sizes for the c-BN and bonding phase of less than 1 micron. Consequently, due to the resultant high strength, damage and chipping of the cutting edge did not occur even under severe conditions of high speed interrupted finishing cutting of high strength steel, and interrupted finishing cutting with high feed rates. Furthermore, the cutting tips showed excellent resistance to wear.

With the comparative cutting tips 1 to 10 shown in Table 2 and Table 4, in spite of using raw material powders having grain sizes not exceeding 1 micron, grain growth during the extreme pressure sintering process resulted in crystal grain sizes exceeding 3 microns. As a result, the strength of the comparative cutting tips 1 to 10 was inadequate so that chipping occurred under the beforementioned extreme conditions, and the useful life of the cutting tip was reached in a short time.

With the cutting tips of the present invention made from high strength c-BN high pressure sintered ceramics, the tip strength was found to be adequate for high speed and heavy cutting conditions. Furthermore, the tool exhibited excellent features relevant to industrial use, such as resistance to damage and wear over remarkably long periods.

The X-ray diffraction test results for specimens of the examples of Table 1 taken after sintering are shown in FIG. 1.

FIG. 1 shows the X-ray diffraction chart for after sintering. Comparing this with the starting materials shows that the Ti$_2$AlC peak has disappeared. Also there are a new AlN peak, a TiB$_2$ peak and a TiC peak appears strong.

The above results show that, the Ti$_2$AlC carbide compound of titanium and aluminum is decomposed into the titanium carbide (TiC) under the high temperature and high pressure sintering conditions, and at the same time, TiB$_2$ and ALN were formed due to the existence of c-BN.

TABLE 3

| Cutting tips of present invention | Bonding phase | maximum crystal grain size (microns) | | relief surface wear (mm) | |
|---|---|---|---|---|---|
| | | c-BN | bonding phase | A | B |
| 1 | TiN, Al$_2$O$_3$, TiB$_2$ | 0.6 | 0.4 | 0.07 | 0.06 |
| 2 | TiC, TiB$_2$, Al$_2$O$_3$ | 0.7 | 0.5 | 0.08 | 0.05 |
| 3 | TiN, Al$_2$O$_3$, TiB$_2$ | 0.3 | 0.5 | 0.06 | 0.08 |
| 4 | TiC, Al$_2$O$_3$, TiB$_2$ | 0.5 | 0.4 | 0.08 | 0.05 |
| 5 | TiC, Al$_2$O$_3$, TiB$_2$ | 0.9 | 0.4 | 0.08 | 0.06 |
| 6 | TiN, Al$_2$O$_3$, TiB$_2$ | 0.6 | 0.4 | 0.06 | 0.06 |
| 7 | TiCN, Al$_2$O$_3$, AlN TiB$_2$ | 0.7 | 0.6 | 0.10 | 0.11 |
| 8 | TiC, AlN, TiB$_2$, TiCN | 0.7 | 0.6 | 0.11 | 0.12 |
| 9 | TiCN, Al$_2$O$_3$, TiB$_2$ | 0.7 | 0.3 | 0.07 | 0.07 |
| 10 | TiCN, Al$_2$O$_3$, TiB$_2$ | 0.5 | 0.3 | 0.08 | 0.09 |
| 11 | TiN, AlN, TiB$_2$ | 0.7 | 0.6 | 0.12 | 0.13 |
| 12 | TiC, Al$_2$O$_3$, AlN, TiB$_2$ | 0.7 | 0.9 | 0.12 | 0.15 |
| 13 | TiN, AlN, TiB$_2$ | 0.5 | 0.9 | 0.14 | 0.15 |

TABLE 4

| Conventional cutting tips | Bonding phase | maximum crystal grain size (microns) | | time until chipping (min) | |
| --- | --- | --- | --- | --- | --- |
| | | c-BN | bonding phase | A | B |
| 1 | TiN, Al$_2$O$_3$, TiB$_2$ | 0.6 | 4 | 3 | 7 |
| 2 | TiN, TiN, TiB$_2$ | 0.9 | 8 | 1 | 3 |
| 3 | TiN, Al$_2$O$_3$, TiB$_2$ | 0.3 | 4 | 3 | 7 |
| 4 | TiC, Al$_2$O$_3$, TiB$_2$ | 0.5 | 3 | 3 | 7 |
| 5 | TiC, Al$_2$O$_3$, TiB$_2$ | 0.9 | 6 | 2 | 5 |
| 6 | TiCN, Al$_2$O$_3$, TiB$_2$ | 0.6 | 4 | 3 | 7 |
| 7 | TiCN, Al$_2$O$_3$, AlN TiB$_2$ | 0.7 | 6 | 2 | 5 |
| 8 | TiC, TiN, AlN, TiB$_2$ | 0.7 | 8 | 1 | 3 |
| 9 | TiC, TiCN, Al$_2$O$_3$, TiB$_2$ | 0.7 | 4 | 3 | 6 |
| 10 | TiCN, Al$_2$O$_3$, TiB$_2$ | 0.5 | 4 | 3 | 7 |

What is claimed is:

1. A cubic boron nitride-based sintered ceramic for cutting tools comprising a bonding phase, a dispersed phase, and unavoidable impurities, wherein said dispersed phase comprises cubic boron nitride, said bonding phase is 20–48% by volume of a decomposed reaction phase derived by the reaction of cubic crystal boron nitride and one or more of Ti$_{2-3}$AlC, Ti$_{2-3}$AlN, and Ti$_{2-3}$AlCN including oxygen, said decomposed reaction phase comprising one or more of TiC, TiN, TiCN and one or more of Al$_2$O$_3$ and AlN, and TiB$_2$, and wherein the crystal grain size in the bonding phase and in the dispersed phase is less than 1 micron.

* * * * *